(12) United States Patent
Howes

(10) Patent No.: US 8,231,340 B2
(45) Date of Patent: Jul. 31, 2012

(54) LEAF SEAL

(75) Inventor: Neil Howes, Hinckley (GB)

(73) Assignee: ALSTOM Technology Ltd., Baden (CH)

( * ) Notice: Subject to any disclaimer, the term of this patent is extended or adjusted under 35 U.S.C. 154(b) by 14 days.

(21) Appl. No.: 13/010,866

(22) Filed: Jan. 21, 2011

(65) Prior Publication Data

US 2011/0135453 A1 Jun. 9, 2011

Related U.S. Application Data

(63) Continuation of application No. PCT/EP2009/059548, filed on Jul. 24, 2009.

(30) Foreign Application Priority Data

Jul. 28, 2008 (GB) .................................. 0813763.0

(51) Int. Cl.
*F04D 29/10* (2006.01)

(52) U.S. Cl. ....................... 415/174.2; 415/230; 277/355

(58) Field of Classification Search .................. 277/355, 277/529; 415/170.1, 173.7, 174.2; 416/174, 416/230

See application file for complete search history.

(56) References Cited

U.S. PATENT DOCUMENTS

| 5,201,530 | A  | * | 4/1993 | Kelch et al. | ............. | 277/355 |
| 6,343,792 | B1 | * | 2/2002 | Shinohara et al. | ......... | 277/355 |
| 2002/0117806 | A1 | | 8/2002 | Grondahl | | |
| 2007/0085277 | A1 | | 4/2007 | Rhodes et al. | | |

FOREIGN PATENT DOCUMENTS

| EP | 1482220 | 12/2004 |
| JP | 2004-162569 | 6/2004 |
| WO | WO2006/016098 | 2/2006 |
| WO | WO2010/012655 | 2/2010 |

OTHER PUBLICATIONS

Search Report from GB Patent App. No. 0813763.0 (Nov. 25, 2008).
Final Office Action for U.S. Appl. No. 11/538,104, dated Jul. 29, 2009.
Most recent claims for U.S. Appl. No. 11/538,104, filed Oct. 3, 2006.
U.S. Appl. No. 12/940,497, filed Nov. 5, 2010, Sivakumaran et al.

* cited by examiner

*Primary Examiner* — Richard Edgar
(74) *Attorney, Agent, or Firm* — Cermak Nakajima LLP; Adam J. Cermak

(57) ABSTRACT

A leaf seal 10 in a rotary machine is located between a higher pressure region 14 and a lower pressure region 16 of the machine. Blow-down forces are greater on the lower pressure side 16 of the leaf seal 10 than on its higher pressure side 14, resulting in greater inward deflection of the leaves 20 on the lower pressure side of the seal than on its higher pressure side, leading in turn to greater wear of the leaves and the contacting rotor surface 44 on the lower pressure side 16 of the seal. To counteract this, the free ends 36 of the leaves 20 can be given a tapered profile 42 to gradually reduce the length of each leaf 20 over its width 'w' from its higher pressure side 14 to its lower pressure side 16, so that the leaves 20 are free to deflect under the blow-down forces by the amount of their reduction in length (a maximum of 'x'), before they contact the rotor surface. As an alternative to profiling the rotor-contacting ends 36 of the leaves, the leaf-contacting surface of the rotor can be given a tapered profile 46 in a minor-reversed version of the leaf-end profile 42.

15 Claims, 1 Drawing Sheet

LEAF SEAL

This application is a Continuation of, and claims priority under 35 U.S.C. §120 to, International application no. PCT/EP2009/059548, filed 24 Jul. 2009, and claims priority therethrough under 35 U.S.C. §§119, 365 to GB application no. 0813763.0, filed 28 Jul. 2008, the entireties of which are incorporated by reference herein.

BACKGROUND

1. Field of Endeavor

The present invention relates to sealing of gaps between relatively rotating machine components to control fluid leakage therethrough, and in particular, to an improved form of leaf seal.

2. Brief Description of the Related Art

It is common practice in rotating machinery, such as gas and steam turbines, to prevent excessive fluid leakage between relatively rotating components by providing them with various types of sealing arrangements. For example, the relatively rotating components may be a shaft rotating within static structure, such as a bearing housing, or a diaphragm that divides areas at different pressures within the turbine. Another example is a stage of shrouded compressor or turbine rotor blades that rotates within a surrounding compressor or turbine casing. Common types of seal used in such situations are labyrinth seals, fin seals and brush seals.

In recent years, so-called "leaf seals" have been the subject of research and development to replace other types of seals in certain situations, particularly where a rotating shaft penetrates a diaphragm. Referring to the part-sectional pictorial sketch of FIG. 1, a typical leaf seal 10 in such a situation is installed around a shaft 12 between a higher pressure region 14 and a lower pressure region 16, and includes an annular array 18 of thin, resiliently flexible metal leaves, the individual leaves 20 conveniently being of a generally rectangular shape and oriented so that they present their side edges 22 to the fluid leakage flow 24 through the annulus 18 of the seal. To protect the side edges 22 of the leaves 20 and restrict leakage flow 24 through the annulus 18, the upstream and downstream faces of the seal are covered by side cheeks 30, 32, respectively, of a housing 28. The leaves 20 are cantilevered, with their radially outer ends held encastré and slightly spaced apart from each other in pockets 34 of a spacer component 40 of the housing 28 and with their lengths extending from the housing 28 towards the shaft 12, so that their radially inner edges 36 are adjacent to, or touching, the shaft surface. In fact, the leaves project inwardly from the housing 28 in a direction that is offset from the radial direction in the direction of rotation of the shaft, the direction of rotation being shown by the arrow 38. In this way, the inherent resilience of the leaves 20 can be used to allow them to bend away from the shaft 12 when small radial excursions of the shaft (so-called "shaft whirling", due to rotor imbalance or large fluctuations in torque loading) causes the shaft surface to come into interfering contact with the free ends of the leaves.

Plainly, the way in which the radially inner edges of the leaves 20 meet the surface of the shaft 12, or other type of rotating component, will have a large influence on the efficiency of the seal. One problem that affects sealing efficiency is excessive "blow-down" of the leaves onto the surface of the rotor. Blow-down is the tendency of the leaves to be blown against the rotor surface by aerodynamic forces generated by rotation of the rotor in the direction of arrow 38, and the pressure differential across the seal. A limited amount of blow-down is desirable to create a good seal between the free ends of the leaves and the rotor, but excessive blow-down forces result in premature wear of the leaves and/or the contacting surface of the rotor.

SUMMARY

It has been found that blow-down forces are greater on the lower pressure side of a leaf seal than on its higher pressure side, resulting in greater inward deflection of the leaves on the lower pressure side of the seal than on its higher pressure side, leading in turn to greater operational wear of the leaves and the contacting rotor surface on the lower pressure side of the seal. To counteract this, one aspect of the present invention includes profiling the free ends of the leaves and/or the leaf-contacting surface of the rotor such that when the rotor is stationary and there are no pressure differences across the seal, a gap between the free ends of the leaves and the leaf-contacting surface of the rotor gradually increases from zero at the higher-pressure side of the seal to a maximum at the lower-pressure side, whereby when the seal is experiencing its normal operating conditions, the leaves are free to deflect through the gap distance under the blow-down forces before they contact the rotor surface. In a large axial flow turbine or compressor, such differential deflection of the leaves between their lower and higher pressure sides may be, for example, of the order of 1 to 3 millimeters.

If the free ends of the leaves are profiled, their profiles may be a linearly tapered profile, in which the length of each leaf from its free end to its encastré end decreases by an equal amount for each unit width of the leaf from its higher pressure side to its lower pressure side. Alternatively, the profile of the free ends of the leaves may be a convexly curved tapered profile, in which the length of each leaf from its free end to its encastré end decreases non-linearly for each unit width of the leaf from its higher pressure side to its lower pressure side.

If the leaf-contacting rotor surface is profiled, its profile may be a linearly tapered profile, in which the radius of the rotor decreases by an equal amount for each unit width of the leaf from its higher-pressure side to its lower-pressure side. Alternatively, the profile of the leaf-contacting rotor surface may be a convexly curved tapered profile, in which the radius of the rotor decreases non-linearly for each unit width of the leaf from its higher-pressure side to its lower-pressure side.

The above-described profiling may be shared between the free ends of the leaves and the leaf-contacting rotor surface, so that differential deflection of the leaves between their lower and higher pressure sides is partly compensated by the tapered profile of the free ends of the leaves, and partly compensated by the tapered profile of the rotor surface.

The above-described leaf seals are particularly suitable to axial flow compressors and turbines.

BRIEF DESCRIPTION OF THE DRAWINGS

Embodiments of the invention will now be described, by way of example only, with reference to the accompanying drawings, in which.

DETAILED DESCRIPTION OF EXEMPLARY EMBODIMENTS

Figure 2:
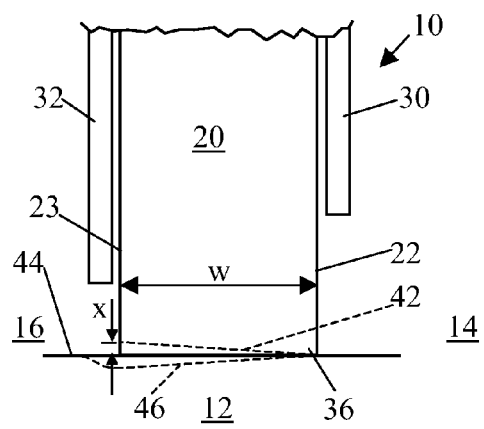
FIG. 2 is a diagrammatic sectional view through part of a leaf seal illustrating first and second embodiments of the invention.

FIG. 2 illustrates how the profile 42 of each individual leaf 20 of the leaf seal 10, and/or the profile 46 of the rotor 12, can be changed to counteract the problem that wear on the leaves and the rotor is greater on the lower pressure side 16 of a leaf seal than on its higher pressure side 14, due to blow-down forces on the leaves being greater on their lower pressure sides. The profile in each case is such that when the rotor 12 is stationary and there are no pressure differences across the seal 10, a gap between the free ends 36 of the leaves 20 and the leaf-contacting surface of the rotor 44 gradually increases from zero at the higher-pressure side 14 of the seal to a maximum 'x' at the lower-pressure side 16. Consequently, when the seal is experiencing its normal operating conditions, the leaves are free to deflect through the gap distance under the blow-down forces before they contact the rotor surface.

Stated another way, when the rotor 12 is stationary and there are no pressure differences across the seal 10, the free ends 36 of the leaves 20 on the lower pressure side of the seal 16 are further away from the rotor surface 44 than the free ends of the leaves on the higher pressure side 14 of the seal by an amount 'x' that is approximately equal to the amount by which the inward deflection of the leaves on the lower pressure side of the seal is greater than the inward deflection of the leaves on the higher pressure side of the seal when the seal is experiencing its normal operating conditions.

In a large axial flow turbine or compressor, such differential deflection of the leaves between their lower and higher pressure sides may be, for example, of the order of 1 to 3 millimeters. The exact amount of differential deflection 'x' that should be allowed for in the profiles 42 and 46 can be determined experimentally, or calculated in accordance with the pressure differential across the width 'w' of the leaves 20, the area of the leaves over which the pressure differential acts, and the stiffness of the leaves.

Figure 1:
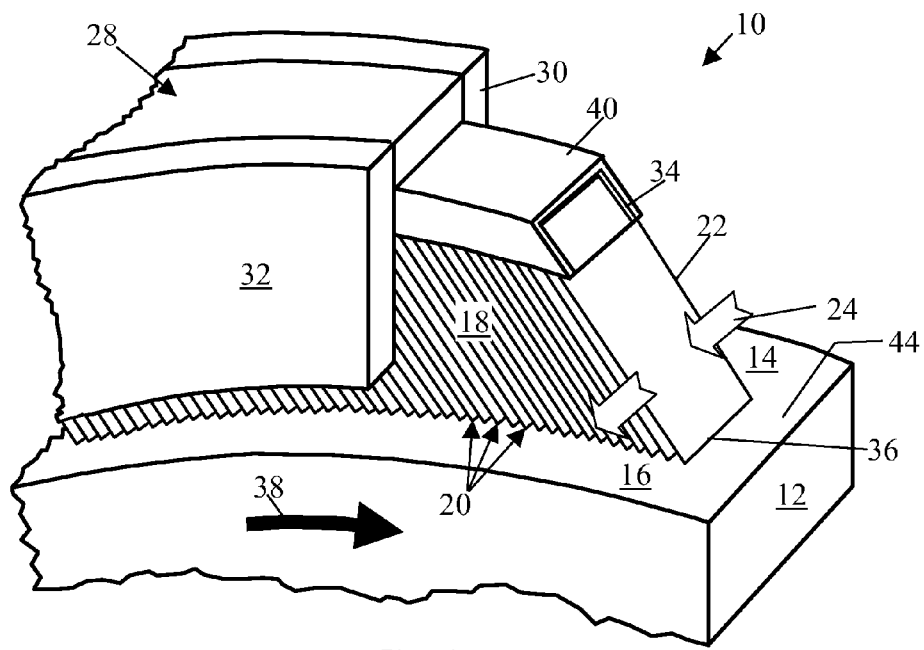
FIG. 1 is a perspective part-sectional sketch view of a known type of leaf seal arrangement.

Thus, in a preferred first embodiment, the free ends 36 of the leaves (i.e., the rotor-contacting edges) are profiled across their widths 'w' as shown by the dashed line 42, which is the condition when the rotor is stationary and there is no pressure difference across the seal 10. When the seal is experiencing its normal operating conditions, the leaves 20 twist under the difference in blow-down forces between their leading and trailing edges 22, 23, so that the free ends 36 of the leaves touch or nearly touch the rotor surface 44 over their entire widths 'w'. Profile 42 is a tapered linear profile, in which the length of each leaf 20, from its free end 36 to its encastré end in spacer component 40 (FIG. 1), decreases by an equal amount for each unit width of the leaf from its higher-pressure or upstream side 22, to its lower-pressure or downstream side 23, the maximum decrease in length being the distance 'x'.

In a less preferred second embodiment, instead of the free ends 36 of the leaves 20 being profiled, the leaf-contacting surface of the rotor 12 is profiled, as shown by the dashed line 46. Profile 46 extends circumferentially around the rotor, thereby forming a groove in its circumferential surface. Again, profile 46 is a tapered linear profile, being basically a reflection of the leaf profile 42 in the surface of the rotor, with a maximum radial depth of 'x'. However, the lower-pressure end 48 of the profile 46 is a reflexive curved shape that joins the radially deepest part of the profile 46 to the low pressure side of the rotor surface 44 in a way that minimizes stress concentration in the rotor.

Figure 3:
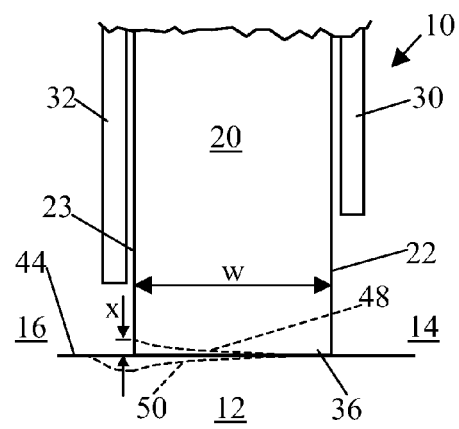
FIG. 3 is a view similar to FIG. 2, but illustrating alternative embodiments of the invention.

FIG. 3 illustrates a preferred alternative third embodiment, in which the profile 48 of the free ends 36 of the leaves 20 is a convexly curved tapered profile, whereby the length of each leaf 20 from its free end 36 to its encastré end decreases non-linearly, but smoothly, for each unit width of the leaf from its upstream side 22 to its downstream side 23. Assuming that the deflection per unit width of the leaves 20 is greater near the downstream sides 23 of the leaves than at their upstream sides (due, e.g., to a non-linear pressure distribution across the widths 'w' of the blades), an appropriately curved profile may give a better match to the surface of the rotor when the leaves are in their deflected position. The exact form of the curved profile 48 may be calculated, or determined experimentally.

FIG. 3 also illustrates a less preferred fourth embodiment, analogous to the second embodiment of FIG. 2, in which instead of the free ends 36 of the leaves 20 having a convexly curved tapered profile 48, the leaf-contacting surface 44 of the rotor 12 has a convexly curved tapered profile 50. Profile 50 is basically a mirror image of profile 48, so that the radius of the rotor decreases non-linearly, but smoothly, for each unit width of the leaf 20 from its upstream side 22 to its downstream side 23, achieving a maximum reduction of radius of 'x'. As was necessary in FIG. 2, the radially deepest part of the resulting groove in the rotor's circumference is joined to the low pressure side of the rotor surface 44 by a reflexive curved shape so that stress concentrations in the rotor are minimized.

Whereas the above-described tapered profiles 42, 46, 48, 50 have been provided on either the leaves 20 or the rotor 12, it would also be possible to share the profiling between the free ends 36 of the leaves and the leaf-contacting surface 44 of the rotor. In this way, the differential deflection of the leaves between their lower and higher pressure sides would be partly compensated by a shallower tapered profile of the free ends of the leaves, and partly compensated by a shallower tapered profile in the rotor surface.

The present invention has been described above purely by way of example, and modifications can be made within the scope of the invention as claimed. Thus, the breadth and scope of the present invention should not be limited by any of the above-described exemplary embodiments. Each feature disclosed in the specification, including the claims and drawings, may be replaced by alternative features serving the same, equivalent or similar purposes, unless expressly stated otherwise.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

I claim:

1. A seal system for use in a rotary machine, the rotary machine having a higher pressure region and a lower pressure region on opposite sides of the seal system during normal operation of the rotary machine, the rotary machine including static structure, the seal system comprising:
   a rotor including an outer surface with a leaf-contacting surface portion; and
   a circumferential array of resiliently flexible metal leaves configured and arranged to seal between said static structure of the machine and the rotor, each leaf having a static end and a free end that contacts the rotor when the rotary machine is in use;

wherein, to counteract excessive operational wear of the leaves and the leaf-contacting rotor surface portion on a lower pressure side of the seal system due to blow-down forces that are greater on the lower pressure side of the leaf seal than on a higher pressure side, the free ends of the leaves, the leaf-contacting surface portion, or both has a profile such that when the rotor is stationary and there are no pressure differences across the seal system, a gap is formed between the free ends of the leaves and the leaf-contacting surface portion which gradually increases from zero at the higher-pressure side of the seal system to a maximum at the lower-pressure side of the seal system, and during normal operation of the rotary machine, the leaves are free to deflect through the gap distance under the blow-down forces before the leaves contact the rotor leaf-contacting surface portion.

2. A seal system according to claim 1, wherein the free ends of the leaves having a linearly tapered profile, wherein the length of each leaf from the free end to the static end decreases by an equal amount for each unit width of the leaf from the higher pressure side to the lower pressure side.

3. A seal system according to claim 1, wherein the free ends of the leaves have a convexly curved tapered profile, wherein the length of each leaf from the free end to the static end decreases by a gradually greater amount for each unit width of the leaf from the higher pressure side to the lower pressure side.

4. A seal system according to claim 1, wherein the leaf-contacting rotor surface portion has a linearly tapered profile, wherein the radius of the rotor decreases by an equal amount for each unit width of the leaf from the higher-pressure side to the lower-pressure side.

5. A seal system according to claim 1, wherein the leaf-contacting rotor surface portion has a convexly curved tapered profile, wherein the radius of the rotor decreases by a gradually greater amount for each unit width of the leaf from the higher-pressure side to the lower-pressure side.

6. A seal system according to claim 1, wherein the gap between the free ends of the leaves and the rotor leaf-contacting surface portion is partly formed by a tapered profile of the free ends of the leaves and partly formed by a tapered profile of the leaf-contacting rotor surface.

7. An axial flow compressor or turbine comprising:
a static structure; and
a seal system according to claim 1, the leaves sealing between the static structure and the rotor.

8. A leaf seal for use in a rotary machine, the rotary machine having a higher pressure region and a lower pressure region on opposite sides of the leaf seal during normal operation of the rotary machine, the rotary machine including static structure and a rotor including an outer surface with a leaf-contacting rotor surface portion, the leaf seal comprising:
a circumferential array of resiliently flexible metal leaves configured and arranged to seal between said static structure of the machine and the rotor, each leaf having a static end and a free end that contacts the rotor when the rotary machine is in use;
wherein, to counteract excessive operational wear of the leaves and the leaf-contacting rotor surface portion on a lower pressure side of the seal system due to blow-down forces that are greater on the lower pressure side of the leaf seal than on a higher pressure side, the free ends of the leaves have a profile such that when the rotor is stationary and there are no pressure differences across the leaf seal, a gap is formed between the free ends of the leaves and the leaf-contacting surface portion which gradually increases from zero at the higher-pressure side of the leaf seal to a maximum at the lower-pressure side of the leaf seal, and during normal operation of the rotary machine, the leaves are free to deflect through the gap distance under the blow-down forces before the leaves contact the rotor leaf-contacting surface portion.

9. A leaf seal according to claim 8, wherein the free ends of the leaves having a linearly tapered profile, wherein the length of each leaf from the free end to the static end decreases by an equal amount for each unit width of the leaf from the higher pressure side to the lower pressure side.

10. A seal system according to claim 8, wherein the free ends of the leaves have a convexly curved tapered profile, wherein the length of each leaf from the free end to the static end decreases by a gradually greater amount for each unit width of the leaf from the higher pressure side to the lower pressure side.

11. An axial flow compressor or turbine comprising:
a static structure and a rotor; and
a leaf seal according to claim 8, the leaves sealing between the static structure and the rotor.

12. A seal system for use in a rotary machine, the rotary machine having a higher pressure region and a lower pressure region on opposite sides of the seal system during normal operation of the rotary machine, the rotary machine including static structure and a circumferential array of resiliently flexible metal leaves configured and arranged to seal between said static structure of the machine and a rotor, each leaf having a static end and a free end that contacts the rotor when the rotary machine is in use, the seal system comprising:
a rotor including an outer surface with a leaf-contacting surface portion;
wherein, to counteract excessive operational wear of the leaves and the leaf-contacting rotor surface portion on a lower pressure side of the seal system due to blow-down forces that are greater on the lower pressure side of the leaves than on a higher pressure side, the leaf-contacting surface portion has a profile such that when the rotor is stationary and there are no pressure differences across the leaves, a gap is formed between the free ends of the leaves and the leaf-contacting surface portion which gradually increases from zero at the higher-pressure side of the leaves to a maximum at the lower-pressure side of the leaves, and during normal operation of the rotary machine, the leaves are free to deflect through the gap distance under the blow-down forces before the leaves contact the rotor leaf-contacting surface portion.

13. A seal system according to claim 12, wherein the leaf-contacting rotor surface portion has a linearly tapered profile, wherein the radius of the rotor decreases by an equal amount for each unit width of the leaf from the higher-pressure side to the lower-pressure side.

14. A seal system according to claim 12, wherein the leaf-contacting rotor surface portion has a convexly curved tapered profile, wherein the radius of the rotor decreases by a gradually greater amount for each unit width of the leaf from the higher-pressure side to the lower-pressure side.

15. An axial flow compressor or turbine comprising:
a static structure and a leaf seal attached to the static structure; and
a seal system according to claim 12, the leaves sealing between the static structure and the rotor.

* * * * *